Figure 1:
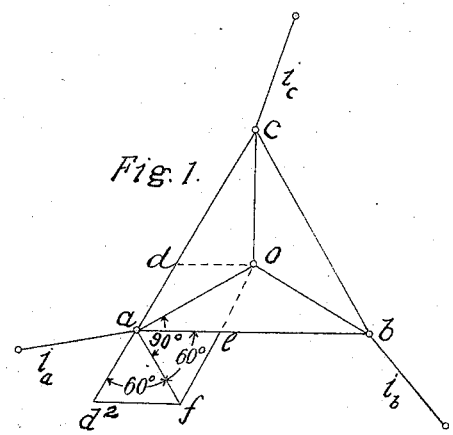
Figure 2:
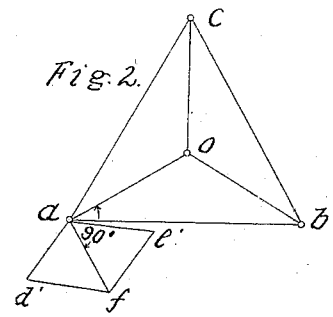

No. 689,130. Patented Dec. 17, 1901.
K. O. F. SCHROTTKE.
ALTERNATING CURRENT METER.
(Application filed Sept. 2, 1899.)
(No Model.)

Witnesses
May Label
C. E. Schubert

Inventor:
Karl Otto Franz Schrottke,
By Charles A. Brown & Cragg
Attorneys.

United States Patent Office.

KARL OTTO FRANZ SCHROTTKE, OF BERLIN, GERMANY, ASSIGNOR TO SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 689,130, dated December 17, 1901.

Application filed September 2, 1899. Serial No. 729,323. (No model.)

*To all whom it may concern:*

Be it known that I, KARL OTTO FRANZ SCHROTTKE, a subject of the Emperor of Germany, residing at Berlin, Germany, have invented a certain new and useful Improvement in Alternating-Current Meters, (Case No. 218,) of which the following is a full, clear, concise, and exact description, reference being had to the accompanying drawings, forming a part of this specification.

My invention relates to alternating-current meters, and has for its object the provision of an improved means for adjusting the phase difference between the shunt-field and the pressure impressed upon the shunt-circuit.

Measurement of power in a polyphase system is usually conducted in two ways. According to one way—in a three-phase system, for example—the product of the current in one branch and the difference of potential between that branch and a point whose potential is the average of the three potentials of the circuit is taken. According to the other, the product of the current of one branch with the difference of potential between that branch and one of the other branches is taken. This second method is based upon the well-known two-wattmeter method of measuring the energy of a three-phase circuit. In this instance the circuit must be balanced. The power-reading of a wattmeter whose current-coil is connected in series with one of the conductors of the circuit and whose pressure-coil is connected between this conductor and one of the other conductors of the circuit will be $$\sqrt{3}\, C\, E\, \cos.\, (\varphi + 30°),$$

and the power-reading when the pressure-circuit is included between the conductor including the series coils and the remaining conductor is $$\sqrt{3}\, C\, E\, \cos.\, (\varphi - 30°).$$

The sum of these two readings is $$\sqrt{3}\, C\, E\, \{\cos.\, (\varphi + 30°) + \cos.\, (\varphi - 30°)\} = 3\, C\, E,$$

where C, E, and cos. $\varphi$ represent, respectively, the current, pressure, and lag-angle in an armature-coil. The first method is employed if the result is to be ascertained in three readings, there being an unequal loading upon the legs of the system, or in one reading when the system is evenly balanced. The second method may be employed if the result is to be obtained after two readings. In taking these readings with dynamometers the current in the pressure-coil must be in phase with the pressure applied at its terminals. If rotary field instruments are employed, however, it is essential that the phase of the shunt-field be displaced ninety degrees from the phase of the pressure at its terminals. These last conditions are ordinarily difficult to fulfill, and it is the object of my present invention to provide a means for readily accomplishing the desired result.

I will describe my invention in connection with the accompanying drawings, illustrating embodiments thereof, in which—

Figure 3:
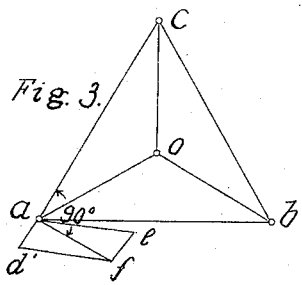
Figure 4:
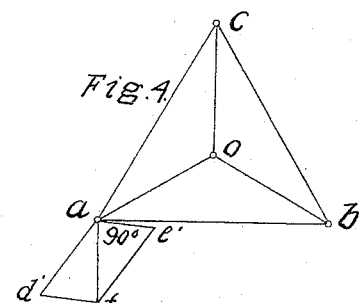
Figure 5:
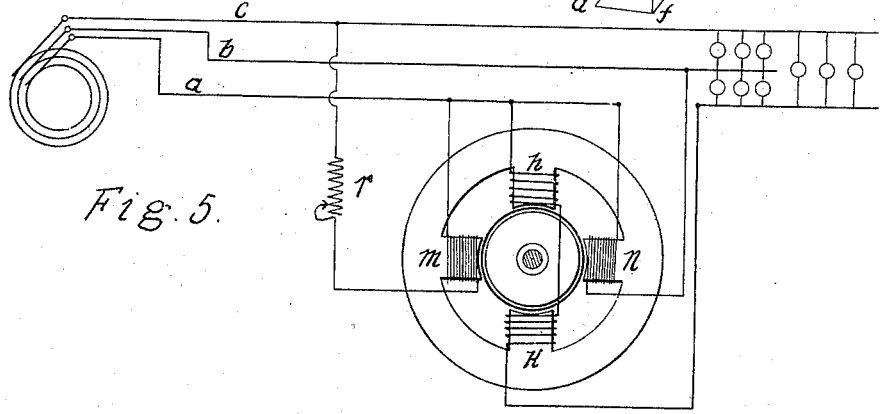
Figure 6:
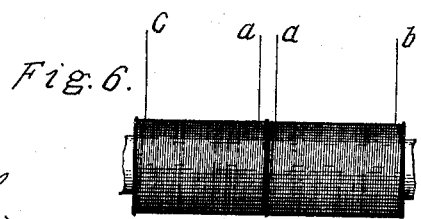

Figures 1, 2, 3, and 4 are mathematical diagrams for demonstrating the electrical phenomena involved. Fig. 5 shows a system of polyphase-current distribution with a wattmeter connected in circuit therewith. Fig. 6 shows a portion of an apparatus that may be employed in practicing the invention.

Like parts are indicated by similar letters of reference in the different figures.

By referring to Fig. 1 the method of measuring the power in a circuit may readily be understood. A triangle is shown having three vertices *a b c*, representing the potentials at the three legs of a three-phase circuit. The center of gravity *o* of the triangle represents the neutral point of the system. By combining the current in one leg *a*, for instance, with the difference of potential between that leg and the neutral point *o* the energy of the circuit is ascertained, in three readings with unequal loading of the legs or in one reading when the system is balanced, as explained above. The shunt-field *a f* must be displaced ninety degrees from the pressure *a o* in this case. According to the second method of determining the energy—*i. e.*, by the two-wattmeter method—the shunt-field *a f* must be displaced ninety degrees from whichever circuit the pressure is taken, $a\ b$ or $a\ c$, as shown in Figs. 3 and 4. I will explain my invention as employed in connection with the second method, its embodiment in connection with the first method being readily understood.

In order to obtain the desired phase displacement, I apply to the shunt-coils of the instrument the pressure from different sources, as illustrated in Fig. 5. I have here shown the three conductors $a\ b\ c$ of the three-phase circuit, together with its source, a meter for measuring its energy, and a series of translating devices. I pass the current from one leg of the circuit $a$, for instance, through the series coils $h\ k$ of the meter. I then preferably connect one shunt-coil $m$ to the source of pressure $a\ c$ between the leg $a$ and one of the other legs $c$ and the other shunt-coil $n$ to the source of pressure $a\ b$ between the leg $a$ and the third leg $b$. The two fields $a\ d$ and $a\ e$, Fig. 1, created by the shunt-coils are each in phase with their respective pressures $a\ c$ and $a\ b$, and a resultant field is obtained which, neglecting self-induction, is in phase between the conductor $a$ and the neutral point $o$. To obtain a field which shall be displaced ninety degrees from this, I preferably reverse the connections of one of the shunt-coils, as that between the legs $a\ c$. This reverses the direction of one field $a\ d$ to the direction $a\ d^2$ and places the resultant field $a\ f$ ninety degrees away from the first resultant of the two fields. The self-induction, however, cannot be left out of consideration, as I have found in practice a displacement of six degrees between the fields created by the coils and their respective pressures, Fig. 2. I therefore preferably dampen the field $a\ d'$, due to one pressure $a\ c$, and strengthen the field $a\ e'$, due to the other pressure $a\ b$, in order to maintain the desired displacement of ninety degrees. To obtain a resultant field perpendicular to either of the pressures of the circuit $a\ c$ or $a\ b$, Figs. 3 and 4, I preferably change the ratio of the ampere turns between the two coils until the displacement of the resultant field $a\ f$ has reached its desired magnitude. In the first case the resultant field $a\ f$ is displaced sixty degrees from either of the pressures producing it. If the direction of these pressures be reversed, the displacement will be one hundred and twenty degrees.

The reversal of the connections of one of the pressure-coils does not in any way change the magnitude of the field which depends upon the ampere turns of each coil, but simply brings the phase thereof in quadrature with the resultant pressure when the meter is an induction-motor meter.

The sensibility of the instrument may be readily changed by a proportionate increase in the number of turns of the two windings without materially affecting the displacement of the resultant shunt-field. The same result may be secured by a resistance $r$.

It will be observed that the series winding of the meter is included in that conductor to which a terminal of each of the shunt-coils is connected. The two shunt-fields $m\ n$ are not alike at each instant, even though there should be equal ampere turns, inasmuch as they are not of the same phase. This, however, will only serve to change the constant and introduces no theoretical error, as a decrease of one shunt-field $m$ is accompanied by an equal increase in the other shunt-field $n$.

When bipolar instruments which have but one pressure-winding are used, I preferably divide the winding into a number of coils—in this instance two. The connections of the coils with the circuit are the same as when the coils are wound upon separate poles, the resultant action of the fields being identical. The division of the winding into coils, with reference-letters indicating how the coils are to be included in the circuit, is shown in Fig. 6, the resultant field being in quadrature with the pressure, as explained above.

Having thus described my invention, I claim as new and desire to secure by Letters Patent—

1. The combination with a polyphase system of electrical distribution, of an electric meter having a series coil included in one transmission-conductor, two shunt-coils wound in opposite directions, each having a terminal connected with the said transmission-conductor and their remaining terminals connected with other transmission-conductors, and a measuring element subjected to the influence of the fields due to the said windings, substantially as described.

2. The combination with a polyphase system of electrical distribution, of an electric meter having a series coil included in one transmission-conductor, two shunt-coils wound in opposite directions, each having a terminal connected with the said transmission-conductor and their remaining terminals connected with other transmission-conductors, a measuring element subjected to the influence of the fields due to the said windings, and means for varying the relative magnetic effects due to the shunt-coils to produce required phase difference, substantially as described.

In witness whereof I hereunto subscribe my name this 15th day of August, A. D. 1899.

KARL OTTO FRANZ SCHROTTKE.

Witnesses:
HENRY HASPER,
WILLIAM MAYNER.